(12) United States Patent
Lewandowski et al.

(10) Patent No.: US 11,125,077 B2
(45) Date of Patent: Sep. 21, 2021

(54) WELLBORE INFLOW DETECTION BASED ON DISTRIBUTED TEMPERATURE SENSING

(71) Applicants: Jerome Lewandowski, Spring, TX (US); Sri Venkata Tapovan Lolla, Houston, TX (US); Badrinarayanan Velamur Asokan, Houston, TX (US)

(72) Inventors: Jerome Lewandowski, Spring, TX (US); Sri Venkata Tapovan Lolla, Houston, TX (US); Badrinarayanan Velamur Asokan, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 163 days.

(21) Appl. No.: 16/454,106

(22) Filed: Jun. 27, 2019

(65) Prior Publication Data

US 2020/0024942 A1 Jan. 23, 2020

Related U.S. Application Data (60) Provisional application No. 62/701,986, filed on Jul. 23, 2018.

(51) Int. Cl.
*E21B 47/103* (2012.01)
*G01V 9/00* (2006.01)
(Continued)

(52) U.S. Cl.
CPC ............ *E21B 47/103* (2020.05); *E21B 47/07* (2020.05); *G01V 9/005* (2013.01); *G01V 9/02* (2013.01)

(58) Field of Classification Search
CPC ...... E21B 47/103; E21B 47/07; E21B 47/135; E21B 47/10; G01V 9/005; G01V 9/02; G01V 8/02
See application file for complete search history.

(56) References Cited

U.S. PATENT DOCUMENTS

| | | | |
|---|---|---|---|
| 2011/0288843 A1* | 11/2011 | Weng | E21B 47/103 703/10 |
| 2020/0032645 A1* | 1/2020 | LeBlanc | G01D 5/35358 |
| 2020/0318473 A1* | 10/2020 | Jarvis | E21B 47/07 |

FOREIGN PATENT DOCUMENTS

| | | | |
|---|---|---|---|
| EP | 3073051 A1 * | 9/2016 | ........ E21B 41/0078 |
| WO | WO-2015126929 A1 * | 8/2015 | ............ E21B 47/07 |
| WO | WO-2015170115 A1 * | 11/2015 | ............ G01F 1/661 |

OTHER PUBLICATIONS

Savitzky. A. et al., (1964) "Smoothing and Differentiation of Data by Simplified Least Squares Procedures", *Analytical Chemistry.* 36 (8): 1627-1639.

(Continued)

*Primary Examiner* — Natalie Huls
*Assistant Examiner* — Michael J Singletary
(74) *Attorney, Agent, or Firm* — Leandro Arechederra, III (57) ABSTRACT

A method for detecting wellbore inflows can include detecting a plurality of temperature values within a wellbore, wherein each temperature value corresponds to a different depth within the wellbore and the temperature values are detected with a distributed temperature measuring technique. The method can also include calculating a plurality of proxy temperatures, wherein each proxy temperature corresponds to one of the temperature values and a reference temperature value. The method can also include calculating a continuous wavelet transform based on the plurality of proxy temperatures. Additionally, the method can include identifying a wellbore inflow based on a combination of the continuous wavelet transform and a wellbore schematic, and generating an alert indicating a location of the wellbore inflow within the wellbore.

13 Claims, 8 Drawing Sheets

(51) Int. Cl.
*G01V 9/02* (2006.01)
*E21B 47/07* (2012.01)

(56) References Cited

OTHER PUBLICATIONS

Goupillaud, P. et al., (1984) Cycle-Octave and Related Transforms in Seismic Signal Analysis. *Geoexploration*, 23: 85-102.

* cited by examiner

WELLBORE INFLOW DETECTION BASED ON DISTRIBUTED TEMPERATURE SENSING

CROSS REFERENCE TO RELATED APPLICATION

This application claims the priority benefit of United States Provisional Patent Application No. 62/701,986 filed Jul. 23, 2018, entitled WELLBORE INFLOW DETECTION BASED ON DISTRIBUTED TEMPERATURE SENSING.

FIELD

The techniques described herein relate to devices for down hole drilling operations. More particularly, the techniques relate to systems and methods for detecting inflows in a wellbore based on distributed temperature sensing data.

BACKGROUND

This section is intended to introduce various aspects of the art, which may be associated with example examples of the present techniques. This discussion is believed to assist in providing a framework to facilitate a better understanding of particular aspects of the present techniques. Accordingly, it should be understood that this section should be read in this light, and not necessarily as admissions of prior art.

Intelligent well technology enables continuous down-hole monitoring and zonal production control. In the production section of a well, temperature is dominated by effects resulting from flow and the relative proportions of the fluid phases. This temperature can be used to estimate a production profile including the relative amount of fluid produced (e.g. oil, gas, and water) in each interval or region of a wellbore. In some examples, the temperature along the wellbore is measured by using an optical distributed temperature sensing (DTS) technology that detects temperatures in a wellbore via a fiber optic cable inserted into the wellbore.

In some examples, to obtain an accurate modeled temperature, a physics-based forward technique is used. In addition, in some examples, the locations of the fluid entries or inflows are specified. In some examples, the locations of the fluid entries or inflows are obtained by visual inspection of the DTS signal. However, a visual approach has the drawback of being approximate, possibly inaccurate, and dependent on the human practitioner. The present techniques use an automated approach to detect the locations of fluid inflows by combining a heuristically-derived temperature variation, wavelet data processing techniques, such as continuous wavelet transform, and information about wellbore schematics.

Several pieces of literature discuss systems in which data is analyzed using cycle-octave transforms and simplified least squares procedures. For example, "Cycle-Octave and Related Transforms in Seismic Signal Analysis" by Goupillaud, 1984, discusses a technique that includes a cycle-octave transform of data in which frequency shifts are replaced by dilations. However, the reference fails to describe detecting inflows into a wellbore based on distributed temperature sensing (DTS) data combined with wellbore schematics.

Additionally, "Smoothing and Differentiation of Data by Simplified Least Squares Procedures" by Savitzky, 1964, discusses a least squares technique to analyze continuous data streams from experiments. However, the reference fails to describe detecting inflows into a wellbore based on distributed temperature sensing (DTS) data combined with wellbore schematics.

These references fail to disclose the techniques herein, which include detecting distributed temperature sensing (DTS) data and calculating a continuous wavelet transform based on proxy temperatures generated from the DTS data. Additionally, the references fail to describe combining the calculated continuous wavelet transform results with wellbore schematics to identify inflows into a wellbore.

SUMMARY

An example provides a system for detecting wellbore fluid inflows. In one example, the system can include a processor that can detect a plurality of temperature values within a wellbore, wherein each temperature value corresponds to a different depth within the wellbore and the temperature values are detected with a distributed temperature measuring technique. The processor can also calculate a plurality of proxy temperatures, wherein each proxy temperature corresponds to one of the temperature values and a reference temperature value. Additionally, the processor can calculate a continuous wavelet transform based on the plurality of proxy temperatures. Furthermore, the processor can identify a wellbore inflow based on a combination of the continuous wavelet transform and a wellbore schematic, and generate an alert indicating a location of the wellbore inflow within the wellbore.

Another example provides a method for detecting wellbore fluid inflows that can include detecting a plurality of temperature values within a wellbore, wherein each temperature value corresponds to a different depth within the wellbore and the temperature values are detected with a distributed temperature measuring technique. The method can also include calculating a plurality of proxy temperatures, wherein each proxy temperature corresponds to one of the temperature values and a reference temperature value. Additionally, the method can include calculating a continuous wavelet transform based on the plurality of proxy temperatures. Furthermore, the method can include identifying a wellbore inflow based on a combination of the continuous wavelet transform and a wellbore schematic and generating an alert indicating a location of the wellbore inflow within the wellbore.

In another example, one or more non-transitory computer-readable media for detecting wellbore fluid inflows can include a plurality of instructions that, in response to execution by a processor, cause the processor to detect a plurality of temperature values within a wellbore, wherein each temperature value corresponds to a different depth within the wellbore and the temperature values are detected with a distributed temperature measuring technique. The plurality of instructions can also cause the processor to calculate a plurality of proxy temperatures, wherein each proxy temperature corresponds to one of the temperature values and a reference temperature value. Additionally, the plurality of instructions can also cause the processor to calculate a continuous wavelet transform based on the plurality of proxy temperatures. Furthermore, the plurality of instructions can also cause the processor to identify a wellbore inflow based on a combination of the continuous wavelet transform and a wellbore schematic, and generate an alert indicating a location of the wellbore inflow within the wellbore.

The foregoing summary has outlined rather broadly the features and technical advantages of examples in order that the detailed description of the techniques that follow may be better understood. It should be appreciated by those skilled in the art that the conception and specific embodiment disclosed may be readily utilized as a basis for modifying or designing other structures for carrying out the same purposes of the present techniques. It should also be realized by those skilled in the art that such equivalent constructions do not depart from the spirit and scope of the techniques described below. The novel features which are believed to be characteristic of the techniques below, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present techniques.

DESCRIPTION OF THE DRAWINGS

The foregoing and other advantages of the present techniques may become apparent upon reviewing the following detailed description and drawings of non-limiting examples of examples in which.

It should be noted that the figures are merely examples of the present techniques and no limitations on the scope of the present techniques are intended thereby. Further, the figures are generally not drawn to scale, but are drafted for purposes of convenience and clarity in illustrating various aspects of the techniques.

DETAILED DESCRIPTION

In the following detailed description section, the specific examples of the present techniques are described. However, to the extent that the following description is specific to a particular embodiment or a particular use of the present techniques, this is intended to be for example purposes only and simply provides a description of the specific examples. Accordingly, the techniques are not limited to the specific examples described below, but rather, it includes all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Distributed temperature sensing" or DTS, as used herein, may include, but is not limited to, detecting temperatures in a wellbore using a fiber optic cable, a wire that can transmit electrical currents, downhole wireless sensors, downhole production tools, and the like. In some examples, DTS includes backscattering detection via a fiber optic cable, or flux measurements via an electrically conductive wire, among others.

"Drilling" as used herein may include, but is not limited to, rotational drilling, slide drilling, directional drilling, non-directional (straight or linear) drilling, deviated drilling, geosteering, horizontal drilling, and the like. The drilling method may be the same or different for the offset and uncased intervals of the wells. Rotational drilling may involve rotation of the entire drill string, or local rotation downhole using a drilling mud motor, where by pumping mud through the mud motor, the bit turns while the drill string does not rotate or turns at a reduced rate, allowing the bit to drill in the direction it points.

A "drill string" is understood to include a collection or assembly of joined tubular members, such as casing, tubing, jointed drill pipe, metal coiled tubing, composite coiled tubing, drill collars, subs and other drill or tool members, extending between the surface and the lower end of the work string, which is connected to the drill bit that forms the wellbore. A drill string may be used for drilling and be a drill string or an installation means. It should be appreciated that the work or drill string may be made of steel, a steel alloy, a composite, fiberglass, or other suitable material.

A "well" or "wellbore" refers to holes drilled vertically, at least in part, and may also refer to holes drilled with deviated, highly deviated, and/or horizontal sections of the wellbore. The term also includes wellhead equipment, surface casing, intermediate casing, and the like, typically associated with oil and gas wells.

Overview

According to examples described herein, techniques are presented to detect inflows in a wellbore. For example, techniques herein can detect inflows of fluids from different reservoirs into a wellbore. In some examples, an inflow of fluids into the wellbore is detected based on DTS data values. As discussed below, the DTS data values can be detected from within the wellbore via fiber optic cables, electrically conductive wires, and the like. A device can apply a smoothing operator and continuous wavelet transform to the DTS data values to detect a location of an inflow of fluid into the wellbore. In some examples, the device can also use a reference temperature, such as a geothermal temperature, among others, to detect the location of the inflow. Furthermore, the device can also detect wellbore schematics to verify the accuracy of the locations of inflows of fluid into the wellbore identified by the continuous wavelet transform.

Accordingly, the techniques described herein can enable a device to automatically detect the location of an inflow of fluid into a wellbore from any suitable depth. The techniques can also include automatically generating an alert or output indicating a location of an inflow into a wellbore and transmitting the alert or output to a remote device. Therefore, the device can transmit the alert or output signal to change inflow control valves based on inflows into a wellbore, quantify oil output from each zone in the wellbore, change the injection of fluids into additional wellbores within a predetermined distance, and the like.

Figure 1:
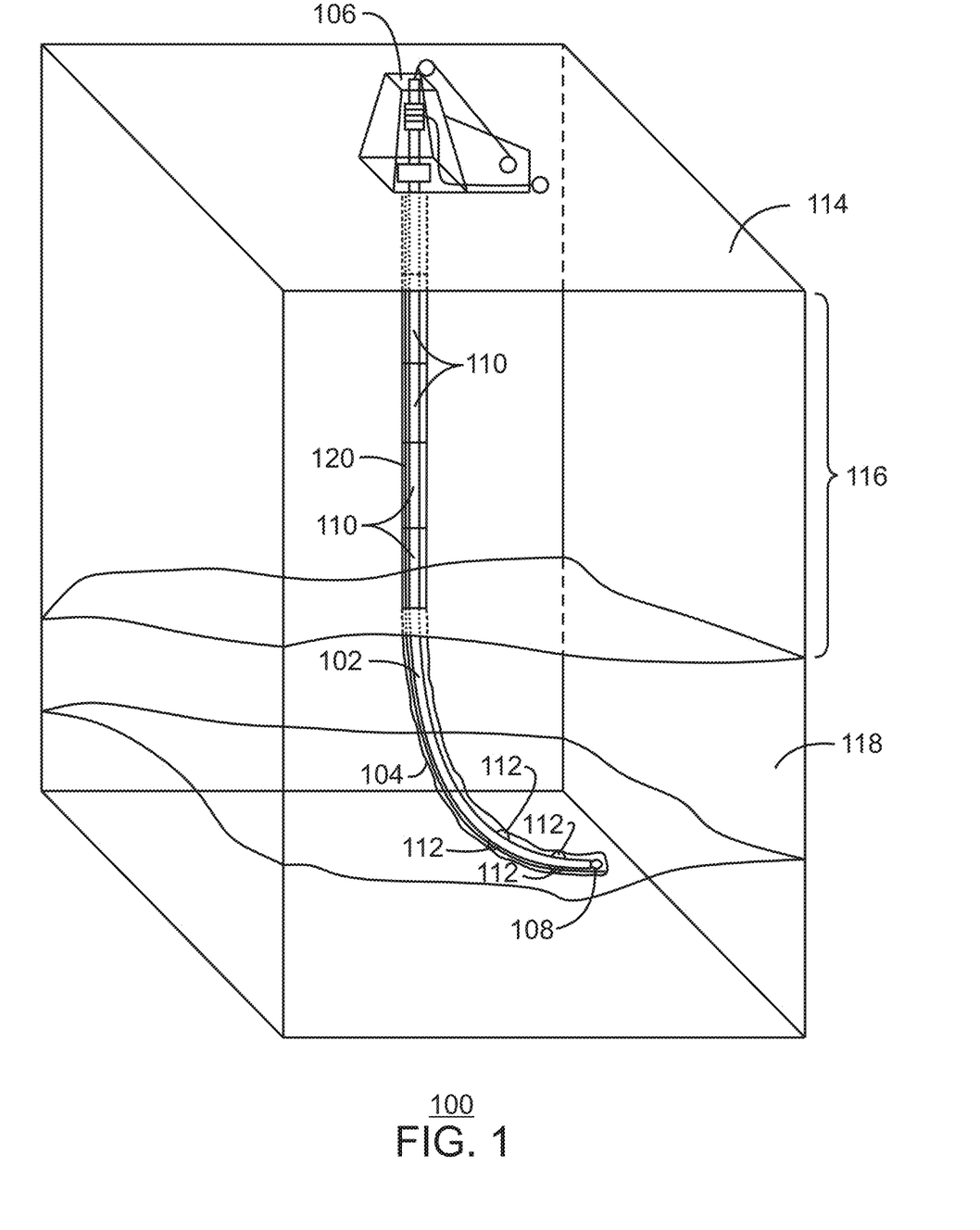
FIG. 1 is an illustration of a system for downhole drilling.

FIG. 1 is an illustration of a system for downhole drilling. The system 100 includes a drill string 102 operating in a wellbore 104. The drill string 102 can be operatively coupled to a drilling rig 106 configured to rotate, push, and pull the drill string 102. The drill string 102 can include a drill bit 108 and multiple segments of drill string, or joints, 110 that can be removed and replaced. Stabilizers 112, placed along the drill string 102, can keep the drill bit 108 in line with the wellbore 104, preventing undesirable deviations and also reducing the contact area between the drill string and the wellbore. The drilling rig 106 can operate the drill string 102 from the top of a surface 114. The wellbore 104 formed is a hole cutting through overburden 116 into a reservoir 118.

In some examples, an optical fiber 120 is placed along the drill string 102. In some examples, the optical fiber 120 detects temperatures at different depths in the wellbore 104. The optical fiber 120 can also be placed within a casing in the wellbore 104, outside of the casing, and the like.

Figure 2:
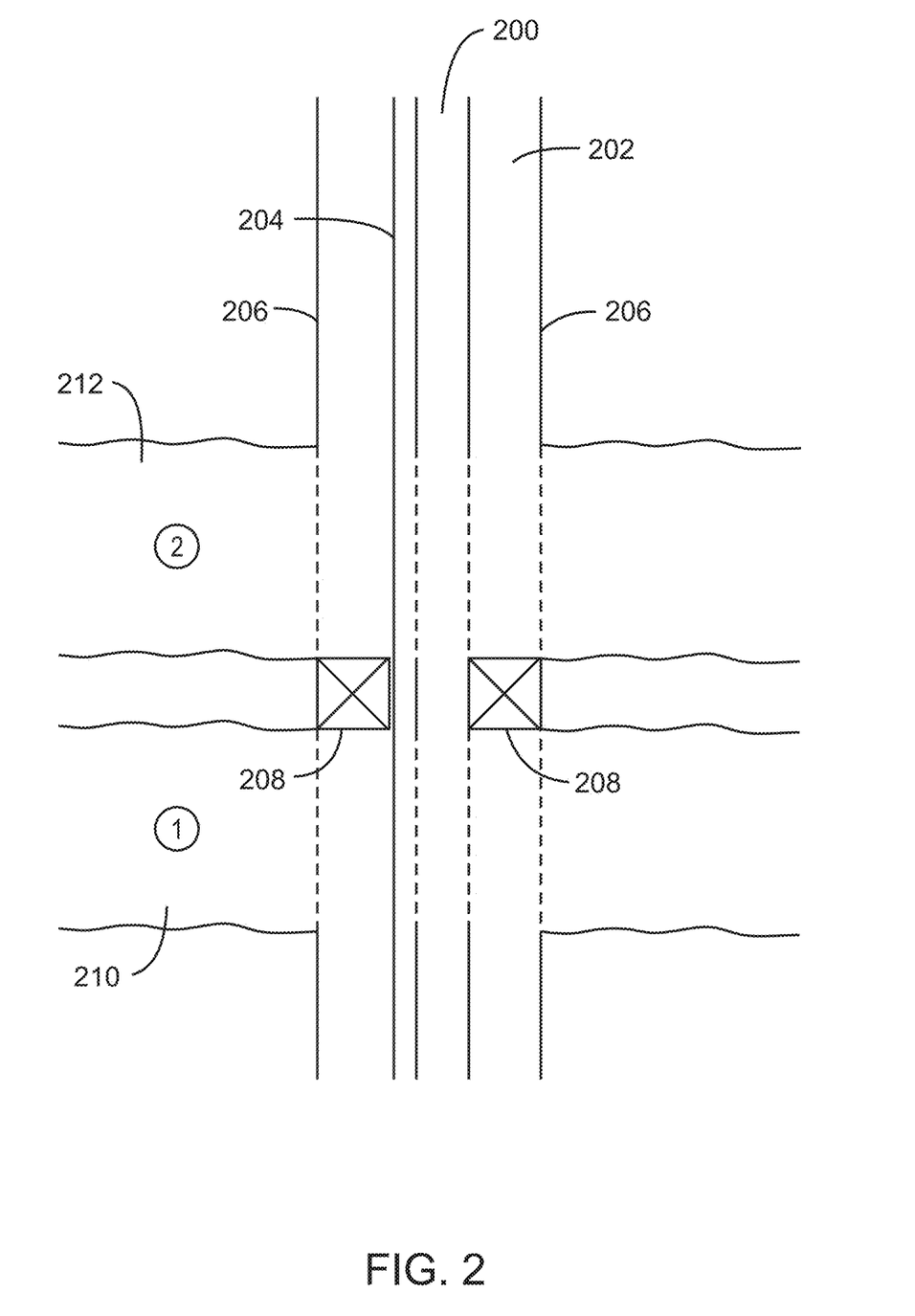
FIG. 2 is an illustration of production piping in a wellbore accessing different reservoirs that can lead to inflows into the wellbore.

FIG. 2 is an illustration of production piping in a wellbore accessing different reservoirs that can lead to inflows into the wellbore. The production piping 200 can operate in a wellbore 202, and may be composed of alternating segments of drill pipe, drill collars, stabilizers, and a drill bit. An optical fiber 204 can be inserted into the wellbore 202 along the inside of the production piping 200, along the outside of the production piping 200, within a casing 206 of the wellbore 202, or outside of the casing 206. In some examples, the optical fiber 204 detects a continuous series of temperature values from the surface to the bottom of the wellbore 202. In some examples, production packers 208 are placed between the casing 206 and the production piping 200 to prevent fluids from flowing between reservoir 1 210 and reservoir 2 212.

Techniques for detecting inflows within a wellbore based on temperature variations detected from the optical fiber are described in greater detail below in relation to FIGS. 3 and 4. For example, techniques described below can determine inflows from any number of reservoirs, such as reservoir 1 210 and reservoir 2 212.

Figure 3:
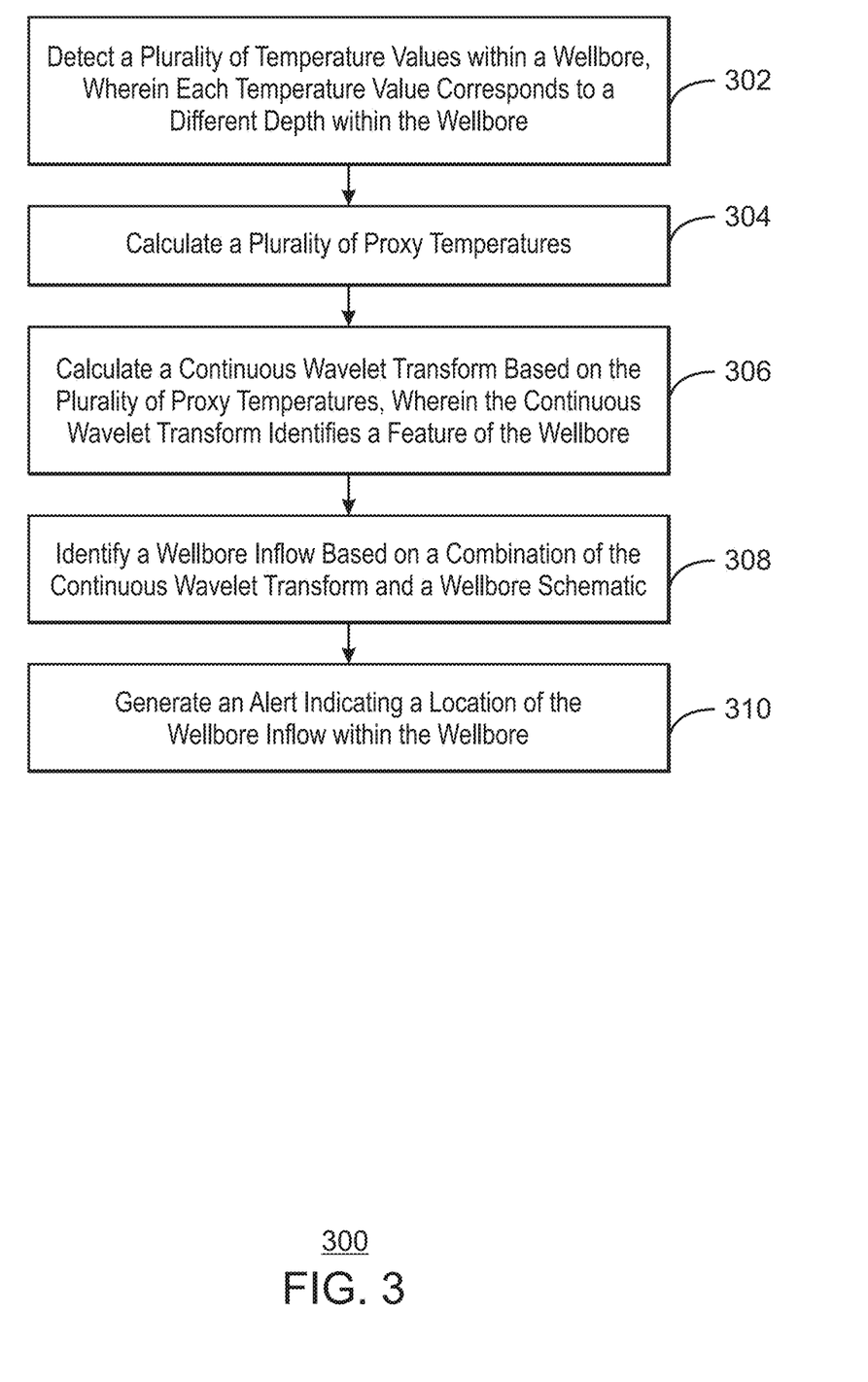
FIG. 3 is an example process flow diagram for detecting wellbore inflows based on temperature variations in the wellbore.

FIG. 3 is an example process flow diagram for detecting wellbore inflows based on temperature variations detected in the wellbore. The method 300 can be implemented with any suitable device, such as the computing device 1100 of FIG. 11 described below.

At block 302, a device can detect a plurality of temperature values within a wellbore. In some examples, each temperature value corresponds to a different depth within the wellbore and the temperature values are detected with a distributed temperature measuring technique. The distributed temperature measuring technique can include placing an optical fiber from the surface of the wellbore to the bottom of the wellbore. The distributed temperature measuring technique can also include placing a wire in the wellbore from the surface to the bottom of the wellbore and detecting a flux measurement from the wire. Alternatively, the distributed temperature measuring technique can include detecting temperature values from one or more downhole wireless sensors in the wellbore or a production logging tool. In some examples, the device can detect the plurality of temperature values from a horizontal wellbore, a vertical wellbore, or any combination thereof.

At block 304, a device can calculate a plurality of proxy temperatures, wherein each proxy temperature corresponds to one of the temperature values and a reference temperature value. A reference temperature, as referred to herein, can include a geothermal temperature or a calibrated temperature within the wellbore. The calibrated temperature can be determined following a shut-in of the wellbore for a predetermined amount of time. In some examples, the geothermal temperature is based on known subsurface temperatures in adjacent wellbores within a predetermined distance from a wellbore being analyzed.

In some examples, the device calculates a proxy temperature for any number of depths within a wellbore based on a smoothing operator applied to a shifted temperature profile of the wellbore. In some examples, the shifted temperature profile is a difference between the reference temperatures and the actual detected temperatures within a wellbore. The smoothing operator applied to the shifted temperature profile is described in greater detail below in relation to FIG. 4.

At block 306, a device can calculate a continuous wavelet transform based on the plurality of proxy temperatures. In some examples, the device can detect a maximum amplitude of a subset of the proxy temperatures identified by the continuous wavelet transform. For example, the continuous wavelet transform can identify a maximum amplitude and frequency in the smoothed proxy temperatures.

The continuous wavelet transform can identify locations within the wellbore that correspond to proxy temperatures that indicate potential inflows of fluid into the wellbore. As discussed below in relation to FIG. 4, the proxy temperatures may not be mapped to a particular location in the well. Rather, the proxy temperatures may be based on a Fourier transform, or any other suitable technique, that does not allow for constructing a time-frequency representation of a signal. The continuous wavelet transform can enable the device to construct the time-frequency representation of the temperature signal and thus enable identifying locations within the wellbore corresponding to proxy temperatures associated with potential inflows of fluids. Furthermore, in some examples, the device identifies locations of potential inflows into the wellbore based on the amplitude and frequency of the smoothed proxy temperatures.

At block 308, a device can identify a wellbore inflow based on a combination of the continuous wavelet transform and a wellbore schematic. For example, the device can compare locations of potential inflows from the continuous wavelet transform to wellbore schematics such as regions of casing, a production packer location in the bottom of a wellbore, and the like. The wellbore schematics can indicate whether an inflow of fluid into the wellbore is possible within a region identified by the continuous wavelet transform. For example, inflows from regions of the wellbore covered in casing are not likely. Similarly, inflows into the wellbore below the production packer or the bottom of the wellbore are not likely. Accordingly, the device can eliminate any potential inflow regions or locations identified by the continuous wavelet transform if the potential inflow regions or locations correspond to cased regions of the wellbore or a depth below the bottom of the wellbore.

At block 310, a device can generate an alert indicating a location of the wellbore inflow within the wellbore. For example, the device can generate any suitable graphical interface output indicating a location of the inflow, a reservoir associated with the inflow, and the like. In some examples, the graphical interface output includes the locations of inflows in a wellbore within a series of two dimensional images, and the like. In some examples, the alert is transmitted to a remote server, a remote device, and the like. For example, the device can transmit the alert to a user monitoring the wellbore. In some examples, the device transmits the alert to a remote computing system and the alert indicates to the remote computing system that a control valve in the wellbore is to be closed or opened based on the location of inflows.

In some examples, the blocks of methods 300 can be executed in alternate orders. Furthermore, the methods 300 can include any suitable number of fewer or additional blocks.

Figure 4:
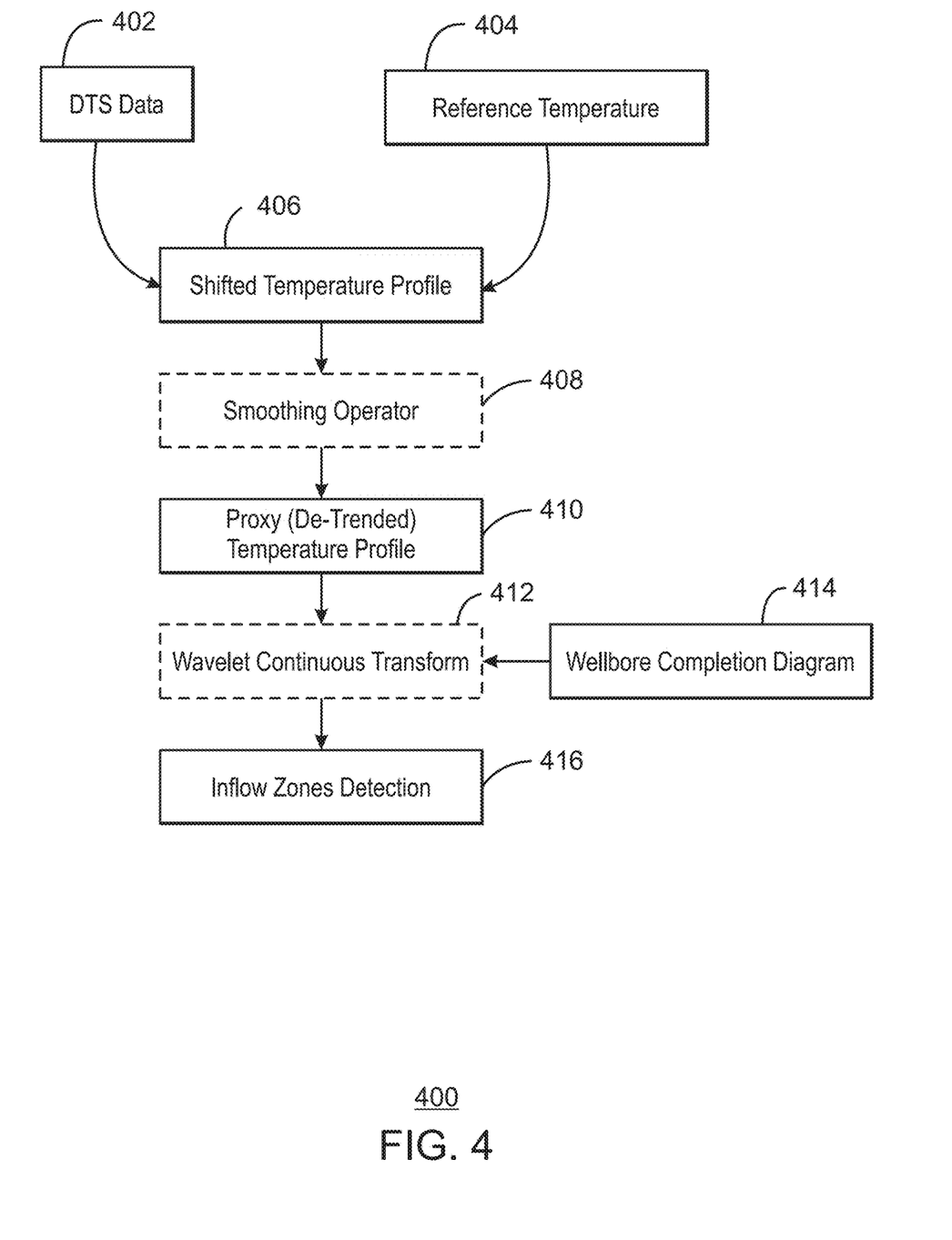
FIG. 4 is an example process flow diagram for detecting wellbore inflows based on temperature variations in the wellbore.

FIG. 4 is another example process flow diagram for detecting wellbore inflows based on temperature variations detected in the wellbore. The method 400 can be implemented with any suitable device, such as the computing device 1100 of FIG. 11 described below.

In FIG. 4, at block 402, a device can detect distributed temperature sensing (DTS) data. As discussed above, the device can detect the DTS data from an optical fiber in the wellbore, a wire in the wellbore, wireless sensors in the wellbore, or a production tool in the wellbore, among others. The DTS data indicates temperatures at different depths within the wellbore at a given time. In some examples, the device can detect the DTS data from a fiber optic cable residing within a casing of the wellbore or outside of the casing of the wellbore. Casing, as referred to herein, includes a hollow steel pipe used to line the inside of a wellbore. In some examples, the fiber optic cable can reside between the exterior of the drill string and the casing. Alternatively, the fiber optic cable can reside outside the casing of a wellbore. In some examples, the fiber optic cable can detect temperatures in a wellbore during pre-production.

In some examples, the device can detect the DTS data from a backscatter circuit. For example, the device can transmit a laser pulse through the fiber optic cable and detect a spectrum of signals via the fiber optic cable following the laser pulse. The backscatter circuit determines a Stokes scattering value and an anti-Stokes scattering value based on the spectrum of signals. The device can determine a temperature at various depths of the wellbore based on the ratio between the Stokes scattering value and the anti-Stokes scattering value. In some examples, the device averages detected signal values based on any suitable period of time. In some examples, the device can detect the signals based on optical time domain reflectometry (OTDR) or optical frequency domain reflectometry (OFDR) techniques.

At block 404, the device can detect data indicating a reference temperature. As discussed above, the reference temperature can refer to geothermal temperatures within the wellbore or a measured reference temperature that is detected after a shut-in of the wellbore for a predetermined period of time. In some examples, the reference temperature can refer to the geothermal temperature initially and, at a later time, the reference temperature can be modified based on a calculated reference temperature that is detected after the wellbore has been in production.

At block 406, the device can calculate a shifted temperature profile. For example, the device can use Equation 1 below to detect the shifted temperature profile. The variable G indicates a shifted temperature for a particular depth in the wellbore based on a difference between the DTS value and a reference temperature.

$$G = T - T_\infty \qquad \text{Eq. 1}$$

At block 408, the device can apply a smoothing operator to the shifted temperature profile. The smoothing operator can remove high frequencies from the shifted temperature profile.

$$G \leftarrow G_s - G \qquad \text{Eq. 2}$$

In Eq. 2, the left arrow indicates replacement of the G value. Additionally, $G_s$ defined below in Eq. 3 denotes the smoothed temperature with a corresponding smoothing operator S(*) and smoothing parameter a. The smoothing parameter a can be any suitable predetermined constant. In some examples, the smoothing operator can be a Savitzky-Golay filter, a global polynomial, a Fourier transform, or a global transform, among others.

$$G_s = S(G, a) \qquad \text{Eq. 3}$$

At block 410, the device can detect a proxy or de-trended temperature profile as a result of the smoothing operator. In some examples, the device can detect the proxy temperature profile based on Equation 4 below.

$$G \leftarrow G - \langle G \rangle \qquad \text{Eq. 4}$$

The variable $\langle G \rangle$ represents an average temperature over a depth interval of interest in the wellbore. The variable $\langle G \rangle$ is defined in Equation 5 below.

$$\langle G \rangle = \frac{1}{L} \int_0^L G(z') dz' \qquad \text{Eq. 5}$$

In Eq. 5, the coordinate z is the distance along the wellbore measured from the deepest point of reference. If the deepest point of reference is located at L, and MD denotes the measured depth, then z=L−MD. Accordingly, L is the distance from the bottom of a wellbore to the surface, while z represents the depth of the temperature value within the wellbore. In one example, z=0 represents the bottom of the wellbore.

At block 412, the device can apply a wavelet continuous transform to the proxy temperature profile. The wavelet continuous transform or continuous wavelet transform (CWT) can transform a continuous time function into wavelets. Therefore, unlike a Fourier transform of temperature values, the continuous wavelet transform can construct a time-frequency representation of a signal that provides time and frequency localization. In some examples, the Equation 6 below is used to calculate the continuous wavelet transform.

$$X_w(a, b) = \frac{1}{|a|^{\frac{1}{2}}} \int_{-\infty}^{\infty} x(t) \overline{\psi}\left(\frac{t-b}{a}\right) dt \qquad \text{Eq. 6}$$

In Equation 6, x(t) represents a function to be transformed based on a scale in which "a" is greater than zero, and the translational value b∈ℝ.

At block 414, the device can detect wellbore schematics. As discussed above, the wellbore schematics can indicate regions of a wellbore that do not correspond to inflows. For example, regions of the wellbore that have casing, or regions of the wellbore below the production packer at the bottom of the wellbore, among others, are not associated with inflows. The device can use the wellbore schematics to isolate a subset of proxy temperature values that do not correspond to inflows. The device can apply the continuous wavelet transform to the subset of proxy temperature values to detect the frequency and amplitude in the signal of smoothed proxy temperatures. The frequency and amplitude can be used to eliminate false positives for inflow locations identified in other regions of the wellbore.

At block 416, the device can detect inflow zones based on the wavelet continuous transform in combination with the wellbore schematics. For example, the device can compare locations of potential inflow from the continuous wavelet transform to the detected wellbore schematics. Accordingly, the device can eliminate any potential inflow regions or locations identified by the continuous wavelet transform if the potential inflow regions or locations correspond to cased regions of the wellbore or a depth below the bottom of the wellbore. In some examples, the device transmits an alert to a remote device indicating the location of an inflow to a wellbore. The device can also generate output regarding the inflow of fluid into a wellbore based on an access level or user credential of a user. For example, different user access levels may receive different information corresponding to the location of an inflow into a wellbore. In some examples, a first user access level can enable a user to retrieve a location of an inflow, while a second user access level can enable the user to retrieve the location of the inflow in addition to the differential temperature values calculated based on a continuous wavelet transform of proxy temperature values. In some examples, the alert or output can adjust a control valve within the wellbore based on the location of the wellbore inflow.

In some examples, the device can detect that a wellbore changes direction from a vertical wellbore to a horizontal wellbore based on wellbore schematics. Accordingly, the device can detect that a region of the wellbore shares a common reference temperature as the wellbore extends horizontally at a common depth. The device can combine the detection of the horizontal wellbore region with the identified inflows from the continuous wavelet transform to verify the accuracy of the identified inflows.

In some examples, the device can detect simultaneous peaks in the continuous wavelet transform data corresponding to two or more perforated zones in the production pipe. The simultaneous peaks indicate a flow from one zone entering the production pipe, traveling to another zone, and exiting the production pipe.

In some examples, the blocks of methods 400 can be executed in alternate orders. Furthermore, the methods 400 can include any suitable number of fewer or additional blocks.

Figure 5:
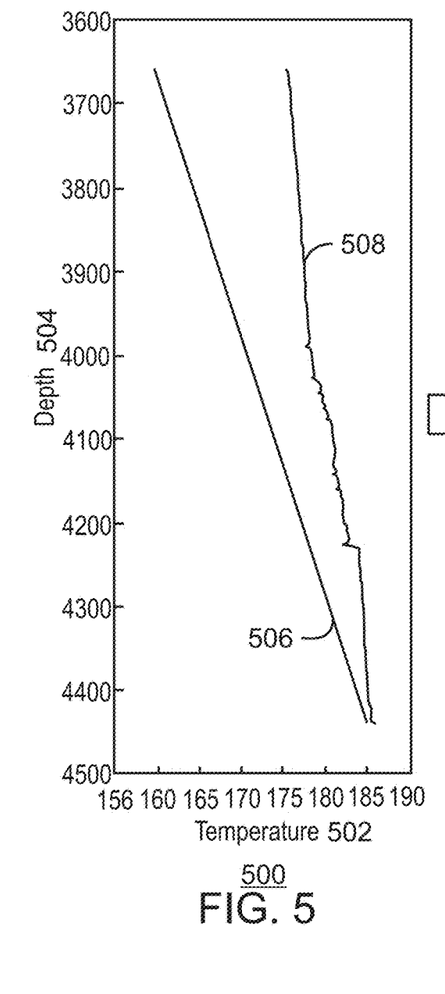
FIG. 5 is a chart depicting temperature values within a wellbore.

FIG. 5 is a chart depicting temperature values within a wellbore. In chart 500, the x-axis 502 depicts temperature values and the y-axis 504 depicts a depth within the wellbore corresponding to the temperature values. The reference temperature values 506 can be included in the chart 500 as measured against the distributed temperature sensing (DTS) values 508. As discussed above, the reference temperature values 506 can indicate a geothermal temperature, a calibrated temperature detected during a shut-in of the wellbore, or DTS-based measurements in a region that has not been exposed to flow, which are extrapolated into flow zone regions. In some examples, the DTS values 508 are detected from an optical fiber, a wire based on flux measurements, from downhole wireless sensors, and the like.

Figure 6:
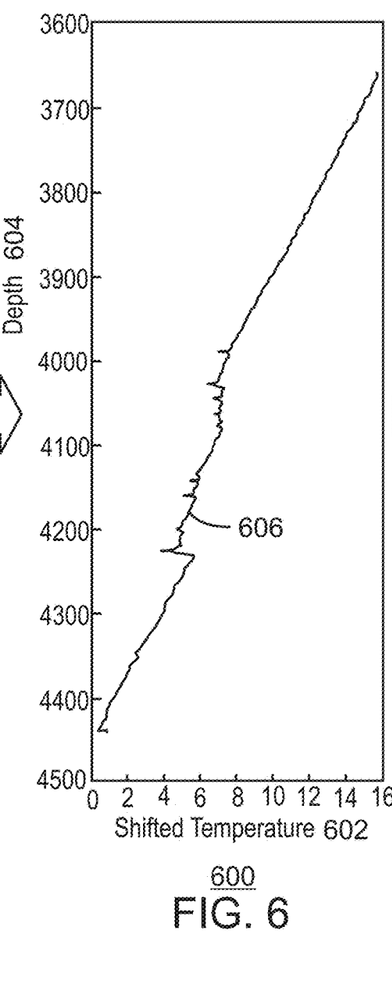
FIG. 6 is a chart depicting a shifted temperature profile of the wellbore.

FIG. 6 is a chart depicting a shifted temperature profile of the wellbore. In chart 600, the x-axis 602 depicts a shift in temperature values and the y-axis 604 depicts a depth within the wellbore corresponding to the shift in temperature values. The shifted temperature profile values 606 indicate a difference or delta between the DTS values 508 of FIG. 5 and the reference temperature values 506 of FIG. 5. The chart 600 corresponds to shifted temperature profile values 606 calculated with Equation 1 discussed above in relation to FIG. 4.

Figure 7:
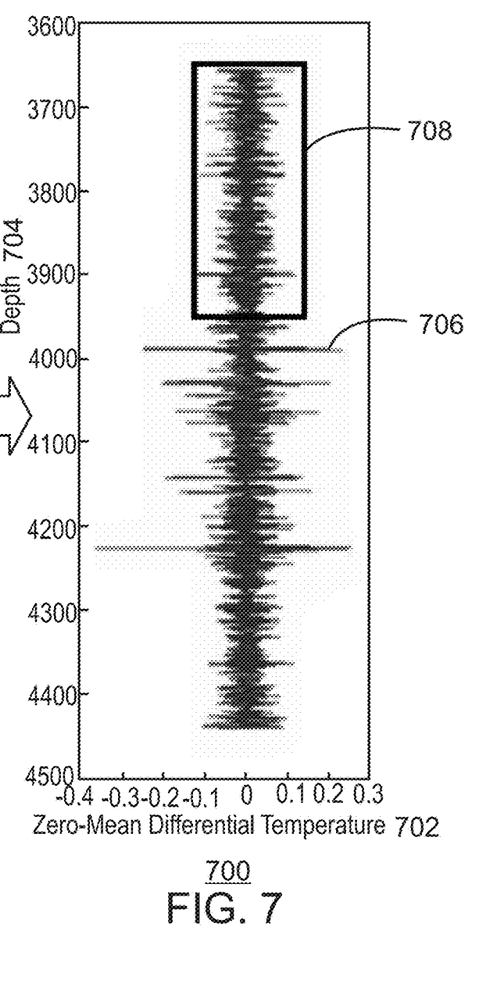
FIG. 7 is a chart depicting proxy temperature values within the wellbore.

FIG. 7 is a chart depicting proxy temperature values within the wellbore. In chart 700, the x-axis 702 depicts zero-mean differential temperature values and the y-axis 704 depicts a depth within the wellbore corresponding to the zero-mean differential temperature values. The zero-mean differential temperatures or proxy temperatures 706 are calculated based on Equation 4 discussed above in relation to FIG. 4. The proxy temperatures 706 represent shifted temperature values that have been smoothed with a smoothing operator, de-trended, and normalized. The box 708 around a portion or subset of the proxy temperatures 706 can indicate proxy temperature values that correspond to a segment of a wellbore with casing, which does not have an inflow. As discussed above, the subset of proxy temperature values within the box 708 can be used with a continuous wavelet transform to identify a frequency and amplitude in the proxy temperatures 706.

Figure 8A:
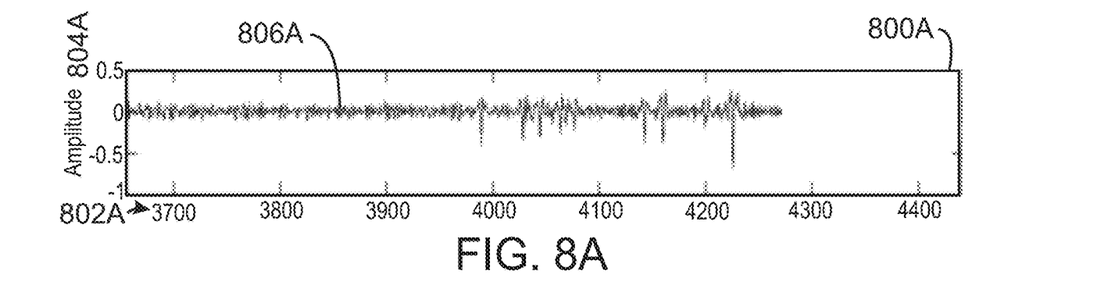
FIGS. 8A, 8B, 8C, 8D, and 8E are example charts illustrating continuous wavelet transform components.

FIGS. 8A, 8B, 8C, 8D, and 8E are example charts illustrating continuous wavelet transform components. In FIG. 8A, the chart 800A includes the x-axis 802A depicting a depth within the wellbore corresponding to the proxy temperature values and the y-axis 804A depicting the proxy temperature values. The signal 806A indicates the various proxy temperature values based on a depth within the wellbore.

Figure 8B:
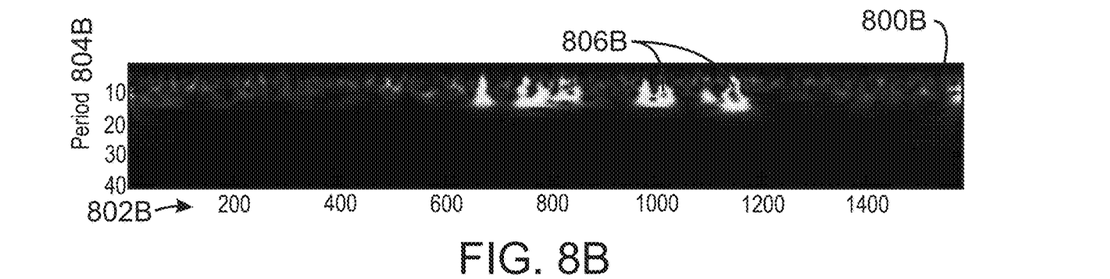

FIG. 8B illustrates the normalized values of a Fourier transform. For example, FIG. 8B includes chart 800B that includes an x-axis 802B depicting normalized values of a signal, and a y-axis 804B depicting period values of the signal. The regions of high activity 806B indicate fluid inflows in a wellbore and correspond to Fourier amplitudes.

Figure 8C:
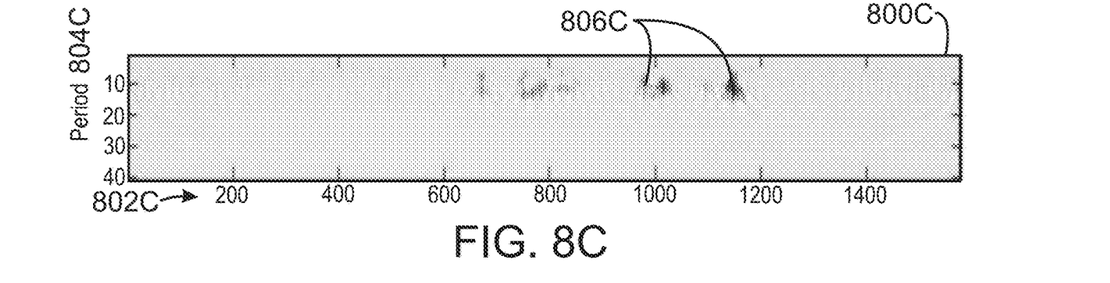

FIG. 8C illustrates the real part values of a Fourier transform. For example, FIG. 8C includes chart 800C that includes an x-axis 802C depicting real part values of a signal, and a y-axis 804C depicting period values of the signal. The regions of high activity 806C indicate fluid inflows in a wellbore and correspond to Fourier amplitudes.

Figure 8D:
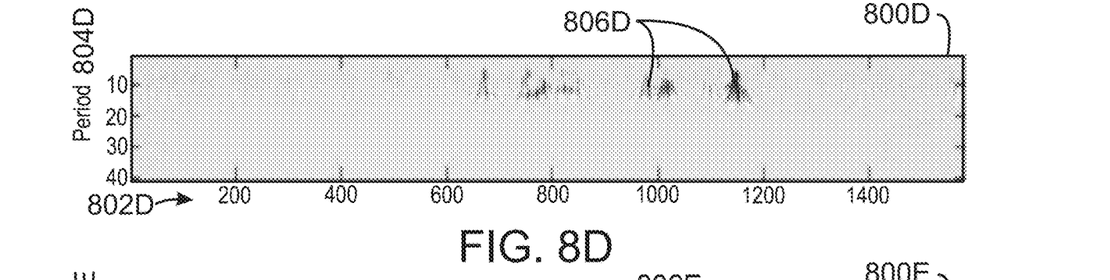

FIG. 8D illustrates the imaginary part values of a Fourier transform. For example, FIG. 8D includes chart 800D that includes an x-axis 802D depicting imaginary part values of a signal, and a y-axis 804D depicting period values of the signal. The regions of high activity 806D indicate fluid inflows in a wellbore and correspond to Fourier amplitudes.

Figure 8E:
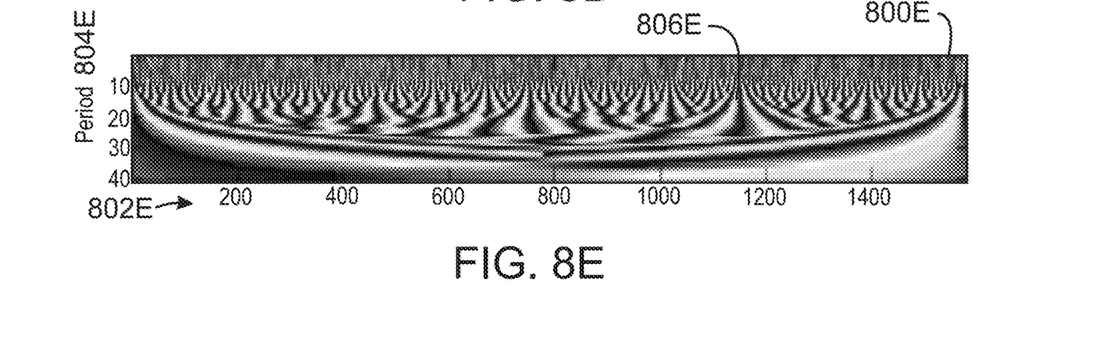

FIG. 8E illustrates the phase values of a Fourier transform. For example, FIG. 8E includes chart 800E that includes an x-axis 802E depicting phase values of a signal, and a y-axis 804E depicting period values of the signal. The regions of high activity 806E indicate fluid inflows in a wellbore and correspond to Fourier amplitudes.

Figure 9:
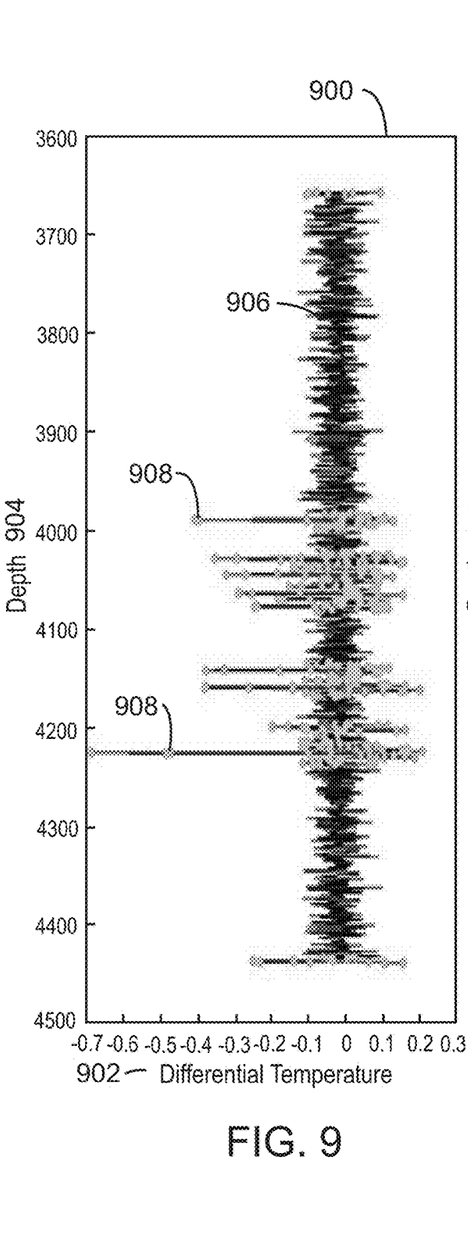
FIG. 9 is a chart depicting inflow locations based on the wavelet transformed proxy temperatures.

FIG. 9 is a chart depicting inflow locations based on the wavelet transformed proxy temperatures. For example, chart 900 includes an x-axis 902 depicting differential temperature values, and a y-axis 904 depicting a depth within a wellbore. The signal 906 in the chart 900 indicates wavelet transformed proxy temperature values. For example, the signal 906 indicates proxy temperatures from FIG. 7, while also indicating potential inflows identified by the wavelet transform components illustrated above in FIGS. 8A, 8B, 8C, 8D, and 8E. In one example, the regions of high activity 806B of FIG. 8B that indicate fluid inflows in a wellbore can be illustrated in FIG. 9 as shaded circles 908.

Figure 10:
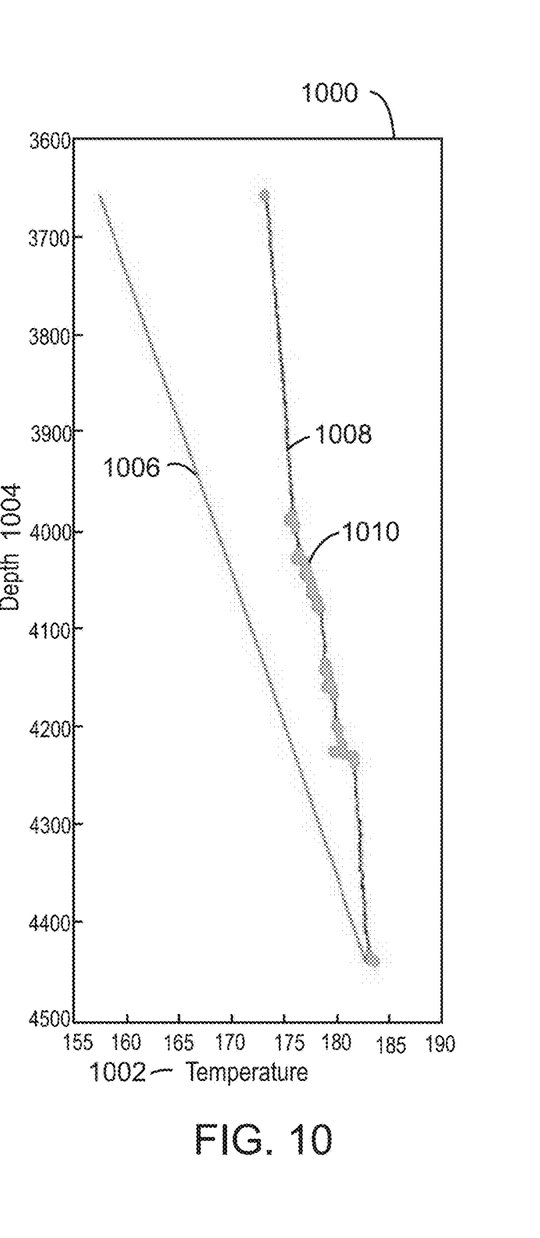
FIG. 10 depicts a superposition of the inflow locations on DTS data.

FIG. 10 depicts a superposition of the inflow locations on DTS data. For example, chart 1000 includes an x-axis 1002 depicting temperature values within a wellbore, and a y-axis 1004 depicting a depth within the wellbore. The reference temperature values are depicted as 1006 and the DTS data values 1008 are depicted proximate the reference temperature values 1006. In some examples, the inflow locations are depicted as shaded circles 1010 placed on the DTS data values 1008 at depths associated with the inflows.

Example Computing System

Figure 11:
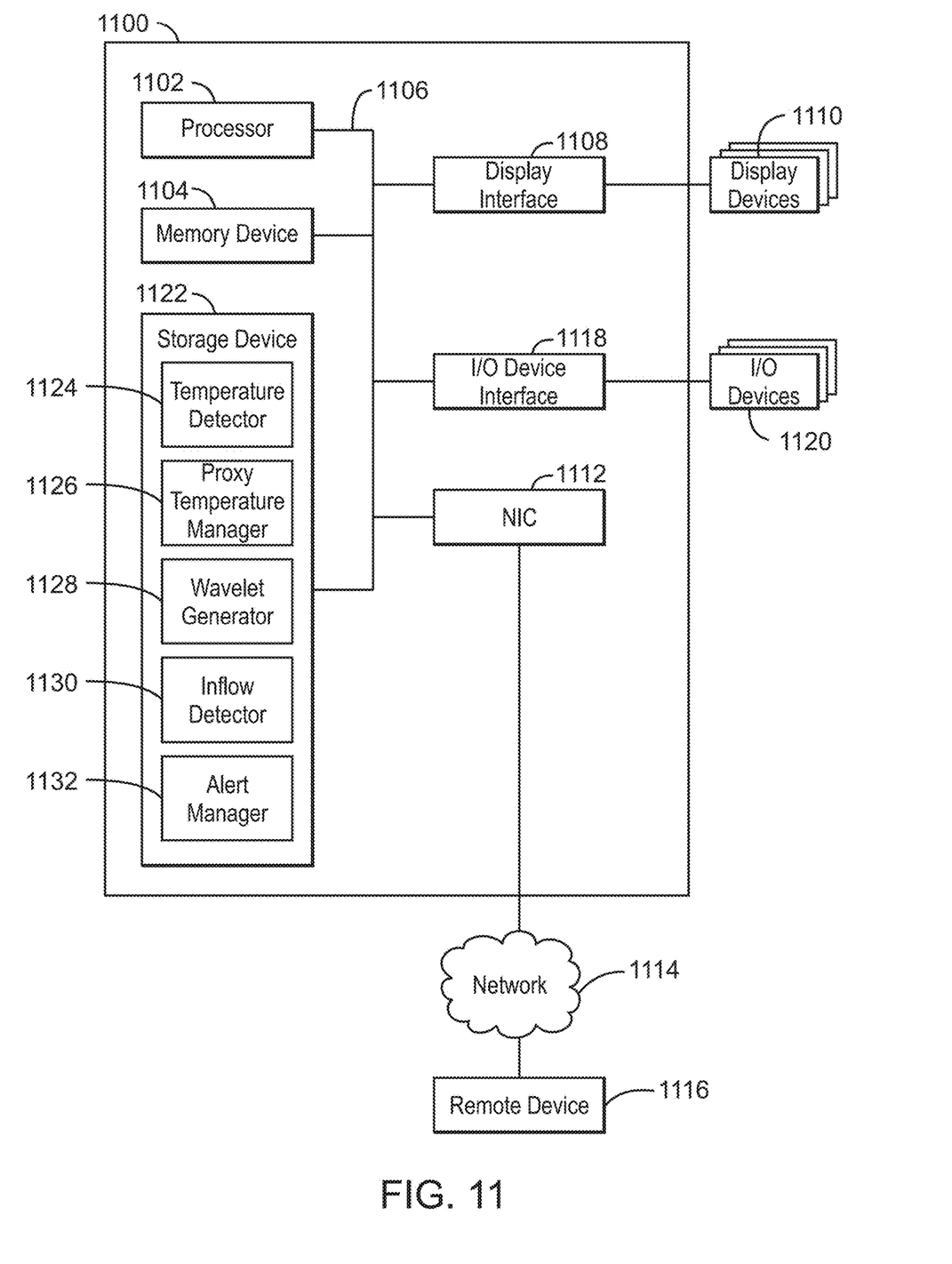
FIG. 11 is an example system diagram that can detect inflows into a wellbore based on DTS data.

FIG. 11 is a block diagram of an example computing device 1100 that may be used in example examples of the present techniques. The computing device 1100 may be, for example, a mobile phone, laptop computer, desktop computer, or tablet computer, among others. The computing device 1100 may include a processor 1102 that is adapted to execute stored instructions, as well as a memory device 1104 that stores instructions that are executable by the processor 1102. The processor 1102 can be a single core processor, a multi-core processor, a computing cluster, or any number of other configurations. The memory device 1104 can include random access memory, read only memory, flash memory, or any other suitable memory systems. The instructions that are executed by the processor 1102 may be used to implement a method that can detect inflows of fluids from different reservoirs into a wellbore.

The processor 1102 may also be linked through the system interconnect 1106 (e.g., PCI®, PCI-Express®, NuBus, etc.) to a display interface 1108 adapted to connect the computing device 1100 to a display device 1110. The display device 1110 may include a display screen that is a built-in component of the computing device 1100. The display device 1110 may also include a computer monitor, television, or projector, among others, that is externally connected to the computing device 1100. The display device 1110 can include light emitting diodes (LEDs), and micro-LEDs, among others.

In addition, a network interface controller (also referred to herein as a NIC) 1112 may be adapted to connect the computing device 1100 through the system interconnect 1106 to a network 1114. The network 1114 can be a cellular network, a radio network, a wide area network (WAN), a local area network (LAN), or the Internet, among others. In some examples, the NIC 1112 can enable the computing device 1100 to transmit data to a remote device 1116 via the network 1114. The remote device 1116 can be a client computing system on an offshore platform, a local computer in a drill shack, or a tablet computer analyzing temperature data from a wellbore, among others.

The processor 1102 may be connected through a system interconnect 1106 to an input/output (I/O) device interface 1118 adapted to connect the computing device 1100 to one or more I/O devices 1120. The I/O devices 1120 may include, for example, a keyboard and a pointing device, wherein the pointing device may include a touchpad or a touchscreen, among others. The I/O devices 1120 may be built-in components of the computing device 1100, or may be devices that are externally connected to the computing device 1100.

In some examples, the processor 1102 may also be linked through the system interconnect 1106 to any storage device 1122 that can include a hard drive, an optical drive, a USB flash drive, a solid state drive or other non-volatile memory, an array of drives, or any combinations thereof. In some examples, the storage device 1122 can include any suitable applications and stored data. For example, the storage device 1122 can include applications that execute the techniques described above in relation to FIGS. 3 and 4. In some examples, the storage device 1122 is non-transitory, computer-readable media such as magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive), among others. The storage device 1122 may be used for the storage of code, models, data, and other information used for implementing the methods described herein. For example, the data storage system may store DTS data and reference temperature values for any suitable number of wellbores, along with inflow locations.

In some examples, the storage device 1122 includes a temperature detector 1124, a proxy temperature manager 1126, a wavelet generator 1128, an inflow detector 1130, and an alert manager 1132. In some examples, the temperature detector 1124 detects a plurality of temperature values within a wellbore, wherein each temperature value corresponds to a different depth within the wellbore and the temperature values are detected with a distributed temperature measuring technique. The proxy temperature manager 1126 can calculate a plurality of proxy temperatures, wherein each proxy temperature corresponds to one of the temperature values and a reference temperature value. In some examples, the wavelet generator 1128 calculates a continuous wavelet transform based on the plurality of proxy temperatures. The inflow detector 1130 can identify a wellbore inflow based on a combination of the continuous wavelet transform and a wellbore schematic. The alert manager 1132 can generate an alert indicating a location of the wellbore inflow within the wellbore.

It is to be understood that the block diagram of FIG. 11 is not intended to indicate that the computing device 1100 is to include all of the components shown in FIG. 11. Rather, the computing device 1100 can include fewer or additional components not illustrated in FIG. 11 (e.g., additional memory components, embedded controllers, additional modules, additional network interfaces, etc.). Furthermore, any of the functionalities of the temperature detector 1124, proxy temperature manager 1126, wavelet generator 1128, inflow detector 1130, and alert manager 1132 may be partially, or entirely, implemented in hardware and/or in the processor 1102. For example, the functionality may be implemented with an application specific integrated circuit, logic implemented in an embedded controller, or in logic implemented in the processor 1102, among others. In some examples, the functionalities of the temperature detector 1124, proxy temperature manager 1126, wavelet generator 1128, inflow detector 1130, and alert manager 1132 can be implemented with logic, wherein the logic, as referred to herein, can include any suitable hardware (e.g., a processor, among others), software (e.g., an application, among others), firmware, or any suitable combination of hardware, software, and firmware. In some examples, any suitable processor-based device may be utilized for implementing all or a portion of examples of the present techniques, including without limitation personal computers, networks personal computers, laptop computers, computer workstations, GPUs, mobile devices, and multi-processor servers or workstations with (or without) shared memory. Moreover, examples may be implemented on application specific integrated circuits (ASICs) or very large scale integrated (VLSI) circuits. In fact, persons of ordinary skill in the art may utilize any number of suitable structures capable of executing logical operations according to the examples.

The present techniques may be susceptible to various modifications and alternative forms and are not intended to be limited to the particular examples disclosed herein. Indeed, the present techniques include all alternatives, modifications, and equivalents falling within the true spirit and scope of the appended claims.

What is claimed is:

1. A method for detecting wellbore fluid inflows comprising:
- detecting a plurality of temperature values within a wellbore, wherein each temperature value corresponds to a different depth within the wellbore and the temperature values are detected with a distributed temperature measuring technique comprising one or more of:
  - a) detecting the plurality of temperature values via a fiber optic cable residing within a casing of the wellbore or outside of the casing of the wellbore;
  - b) detecting a flux measurement from a wire in the wellbore;
  - c) detecting the plurality of temperature values from a downhole wireless sensor; and
  - d) detecting the plurality of temperature values from a production logging tool;
- calculating a plurality of proxy temperatures, wherein each proxy temperature corresponds to one of the temperature values and a reference temperature value;
- calculating a continuous wavelet transform based on the plurality of proxy temperatures;
- identifying a wellbore inflow based on a combination of the continuous wavelet transform and a wellbore schematic; and
- generating an alert indicating a location of the wellbore inflow within the wellbore.

2. The method of claim 1, comprising, when the fiber optic cable is present:
- detecting a spectrum of signals via the fiber optic cable; and
- determining a Stokes scattering value and an anti-Stokes scattering value based on the spectrum of signals.

3. The method of claim 1, wherein the wellbore schematic indicates a region of casing in the wellbore or a production packer location in the wellbore.

4. The method of claim 1, comprising:
- detecting a user credential indicating a user access level; and
- generating an output indicating information related to the location of the wellbore inflow based on the user access level.

5. The method of claim 1, comprising generating an output signal to adjust a control valve within the wellbore based on the location of the wellbore inflow.

6. The method of claim 1, comprising detecting a maximum amplitude identified by the continuous wavelet transform.

7. The method of claim 1, wherein the reference temperature value corresponds to a geothermal temperature or a calibrated temperature detected during a shut-in of the wellbore.

8. A system for detecting wellbore fluid inflows comprising:
- a processor to:
- detect a plurality of temperature values within a wellbore, wherein each temperature value corresponds to a different depth within the wellbore and the temperature values are detected with a distributed temperature measuring technique comprising one or more of:
  - a) detecting the plurality of temperature values via a fiber optic cable residing within a casing of the wellbore or outside of the casing of the wellbore;
  - b) detecting a flux measurement from a wire in the wellbore;
  - c) detecting the plurality of temperature values from a downhole wireless sensor; and
  - d) detecting the plurality of temperature values from a production logging tool;
- calculate a plurality of proxy temperatures, wherein each proxy temperature corresponds to one of the temperature values and a reference temperature value;
- calculate a continuous wavelet transform based on the plurality of proxy temperatures;
- identify a wellbore inflow based on a combination of the continuous wavelet transform and a wellbore schematic; and
- generate an alert indicating a location of the wellbore inflow within the wellbore.

9. The system of claim 8, wherein, when the fiber optic cable is present, the processor is to:
- detect a spectrum of signals via the fiber optic cable; and
- determine a Stokes scattering value and an anti-Stokes scattering value based on the spectrum of signals.

10. The system of claim 8, wherein the wellbore schematic indicates a region of casing in the wellbore or a production packer location in the wellbore.

11. The system of claim 8, wherein the processor is to:
- detect a user credential indicating a user access level; and
- generate an output indicating information related to the location of the wellbore inflow based on the user access level.

12. One or more non-transitory computer-readable media for detecting wellbore fluid inflows comprising a plurality of instructions that, in response to execution by a processor, cause the processor to:
- detect a plurality of temperature values within a wellbore, wherein each temperature value corresponds to a different depth within the wellbore, and wherein the temperature values are detected with a distributed temperature measuring technique comprising one or more of:
  - a) detecting the plurality of temperature values via a fiber optic cable residing within a casing of the wellbore or outside of the casing of the wellbore;
  - b) detecting a flux measurement from a wire in the wellbore;
  - c) detecting the plurality of temperature values from a downhole wireless sensor; and
  - d) detecting the plurality of temperature values from a production logging tool;
- calculate a plurality of proxy temperatures, wherein each proxy temperature corresponds to one of the temperature values and a reference temperature value;
- calculate a continuous wavelet transform based on the plurality of proxy temperatures;
- identify a wellbore inflow based on a combination of the continuous wavelet transform and a wellbore schematic; and
- generate an alert indicating a location of the wellbore inflow within the wellbore.

13. The one or more non-transitory computer-readable media of claim 12, wherein the distributed temperature measuring technique comprises detecting the plurality of temperature values via a fiber optic cable residing within a casing of the wellbore or outside of the casing of the wellbore, and wherein the plurality of instructions cause the processor to detect a spectrum of signals via the fiber optic cable, and determine a Stokes scattering value and an anti-Stokes scattering value based on the spectrum of signals.

* * * * *